United States Patent
Cuomo et al.

(10) Patent No.: US 7,017,014 B2
(45) Date of Patent: Mar. 21, 2006

(54) METHOD, SYSTEM AND PROGRAM PRODUCT FOR MAINTAINING DATA CONSISTENCY ACROSS A HIERARCHY OF CACHES

(75) Inventors: Gennaro A. Cuomo, Apex, NC (US); Steven D. Ims, Apex, NC (US); Brian K. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/353,692

(22) Filed: Jan. 28, 2003

(65) Prior Publication Data
US 2004/0148474 A1    Jul. 29, 2004

(51) Int. Cl.
*G06F 12/00* (2006.01)
(52) U.S. Cl. ............... 711/144; 711/118; 711/156
(58) Field of Classification Search ............ 711/144, 711/156, 118
See application file for complete search history.

(56) References Cited

U.S. PATENT DOCUMENTS

| 5,860,158 A | 1/1999 | Pai et al. |
| 5,862,400 A | 1/1999 | Reed et al. |
| 6,584,548 B1 * | 6/2003 | Bourne et al. ............... 711/134 |
| 2002/0116583 A1 | 8/2002 | Copeland et al. |
| 2002/0123978 A1 | 9/2002 | Bird et al. |
| 2002/0147887 A1 | 10/2002 | Copeland et al. |

OTHER PUBLICATIONS

Tanenbaum, "Structured Computer Organization," Third Edition, p 11, Prentice Hall, 1990.*
Zhu, Huican and Tao Yang, "Class-based Cache Management for Dynamic Web Content," Proceedings of 20th Annual Joint Conference of IEEE Computer and Communications Societies, Apr. 22-26, 2001, Anchorage, Alaska, pp. 1215-1224.

* cited by examiner

*Primary Examiner*—Stephen C. Elmore
(74) *Attorney, Agent, or Firm*—Hoffman, Warnick, D'Alessandro, LLC; Jerry W Herndon

(57) ABSTRACT

A method, system and program product maintains consistency of data across a hierarchy of caches. Under the present invention, each data entry in the hierarchy of caches is assigned its own dependency identifier as well as the dependency identifiers of any data entries on which it depends. Thus, the present invention allows corresponding data entries to be linked for automatic invalidation.

22 Claims, 4 Drawing Sheets

METHOD, SYSTEM AND PROGRAM PRODUCT FOR MAINTAINING DATA CONSISTENCY ACROSS A HIERARCHY OF CACHES

BACKGROUND OF THE INVENTION

1. Field of the Invention

The present invention generally relates to a method, system and program product for maintaining data consistency across a hierarchy of caches. Specifically, the present invention allows corresponding data entries in the hierarchy of caches to be linked based on dependency identifiers.

2. Background Art

As use of the world wide web increases, dynamic websites are becoming more pervasive. For example, through various providers such as YAHOO.COM, a computer user can configure a personalized home page (e.g., MY.YAHOO) that will deliver specific web content according to a desired template. Such home pages are generally known as portal pages. Each portal page has one or more portlets into which certain content is arranged. For example, a home page for user "A" could have separate portlets for sports, weather and business. Typically, the portal pages are generated by a portal program such as WebSphere, which is commercially available from International Business Machines Corp. of Armonk, N.Y. When the user requests his/her home page, the desired content is obtained, and arranged into the appropriate portlets by the portal program. In configuring his/her home page, the user can designate, among other things, what type of content (e.g., sports, weather, stocks, etc.) should be received, what data items are contained within the portlets (e.g., what stock ticker symbols to list in the stock portlet), how the portlets are arranged on the home page, how the data items are arranged (e.g., in what order) within the portlets, display options (e.g., colors), etc.

Generating personalized home pages in this manner for a large number of users has traditionally required a large amount of resources. Specifically, each time a user accesses his/her home page, one or more HTTP requests must be processed in order for the home page to be displayed. Such processing not only includes accessing a database or the like to obtain the actual data items, but also generation of the home page according to the user's established template. Accordingly, as the volume of users increases, the quantity of HTTP requests and the amount of processing grows. In many cases, HTTP requests from different users could be requesting the same information. For example, users "A," "B," and "C" could all have configured their home pages to include the stock price for "IBM." When each of these users requests his/her home page, three separate but identical requests (i.e., to obtained the stock price for IBM) would have to be processed.

In an attempt to reduce resource consumption, one or more caches could be provided in the architecture that provide easy access to data and/or tasks already performed. For example, once a requested stock price is initially obtained, it could be stored in a cache so then when requested again (e.g., by another user), a separate database query is not necessary. To this extent, the stock price could be stored in cache until an updated price is provided, at which point the data entry in the cache containing the old stock price is invalidated.

Problems arise, however, when a hierarchy of caches are utilized in this manner. Specifically, in many implementations, a data entry in one cache could depend upon a data entry in another cache. For example, data entry "X" of cache "A" could store the stock price, while data entry "Z" of cache "B" could store a percentage of change from the previous stock price. When an updated stock price is received, both data entry "X" and "Z" should be invalidated. If data entry "X" is updated while data entry "Z" is not, data inconsistency will result. In general, unless two separate invalidation commands are performed, the two data entries must be associated/linked so that invalidation of one causes invalidation of the other. To date, such linking has been a manual process. In particular, an administrator must manually insert code that allows the various data entries to be linked. This is especially time consuming and tedious since the quantity of data entries that must be linked could be exceedingly high.

In view of the foregoing, there exists a need for a method, system and program product for maintaining data consistency across a hierarchy of caches. Specifically, a need exists for each data entry in each cache in the hierarchy to be assigned a unique dependency identifier. A further need exists for a data entry that depends on another data entry to be assigned both its own dependency identifier, as well as the dependency identifier of the data entry on which it depends. Still yet, a need exists for invalidation of a particular data entry based on its dependency identifier to cause automatic invalidation of any other data entries that were assigned its dependency identifier.

SUMMARY OF THE INVENTION

In general, the present invention provides a method, system and program product for maintaining data consistency across a hierarchy of caches. Specifically, under the present invention, each cache in the hierarchy includes one or more data/cache entries into which data items can be stored. Each "parent" cache could include one or more data entries that are dependent on one or more data entries of "child" caches. To this extent, each data entry is assigned its own dependency identifier as well as the dependency identifiers of the data entries on which it depends. Thus, each data entry will inherit the dependency identifiers of all other data entries on which it depends. Then, when a particular dependency identifier is invalidated, all data entries having that dependency identifier will be automatically invalidated.

According to a first aspect of the present invention, a method for maintaining data consistency across a hierarchy of caches is provided. The method comprises: (1) providing a first data entry in a first cache; (2) assigning a first dependency identifier to the first data entry; (3) providing a second data entry in a second cache; and (4) assigning a second dependency identifier and the first dependency identifier to the second data entry.

According to a second aspect of the present invention, a method for maintaining data consistency across a hierarchy of caches is provided. The method comprises: (1) receiving a request for a data item; (2) obtaining the data item; (3) storing the data item in a first data entry of a first cache; (4) assigning the first data entry a first dependency identifier; (5) performing a data operation based on the data item; (6) storing a result of the data operation in a second data entry of a second cache; and (7) assigning the second data entry a second dependency identifier and the first dependency identifier.

According to a third aspect of the present invention, a system for maintaining data consistency across a hierarchy of caches is provided. The system comprises: (1) a first data entry in a first cache, wherein the first data entry is assigned a first dependency identifier; and (2) a second data entry in a second cache, wherein the second data entry is assigned a second dependency identifier and the first dependency identifier.

According to a fourth aspect of the present invention, a system for maintaining data consistency across a hierarchy of caches is provided. The system comprises: (1) an identifier system for assigning a first dependency identifier to a first data entry of a first cache, and for further assigning the first dependency identifier and a second dependency identifier to a second data entry of a second cache.

According to a fifth aspect of the present invention, a program product stored on a recordable medium for maintaining data consistency across a hierarchy of caches is provided. When executed, the program product comprises program code for assigning a first dependency identifier to a first data entry of a first cache, and for further assigning the first dependency identifier and a second dependency identifier to a second data entry of a second cache.

Therefore, the present invention provides a system, method and program product for maintaining data consistency across a hierarchy of caches.

BRIEF DESCRIPTION OF THE DRAWINGS

These and other features of this invention will be more readily understood from the following detailed description of the various aspects of the invention taken in conjunction with the accompanying drawings in which.

Figure 1:
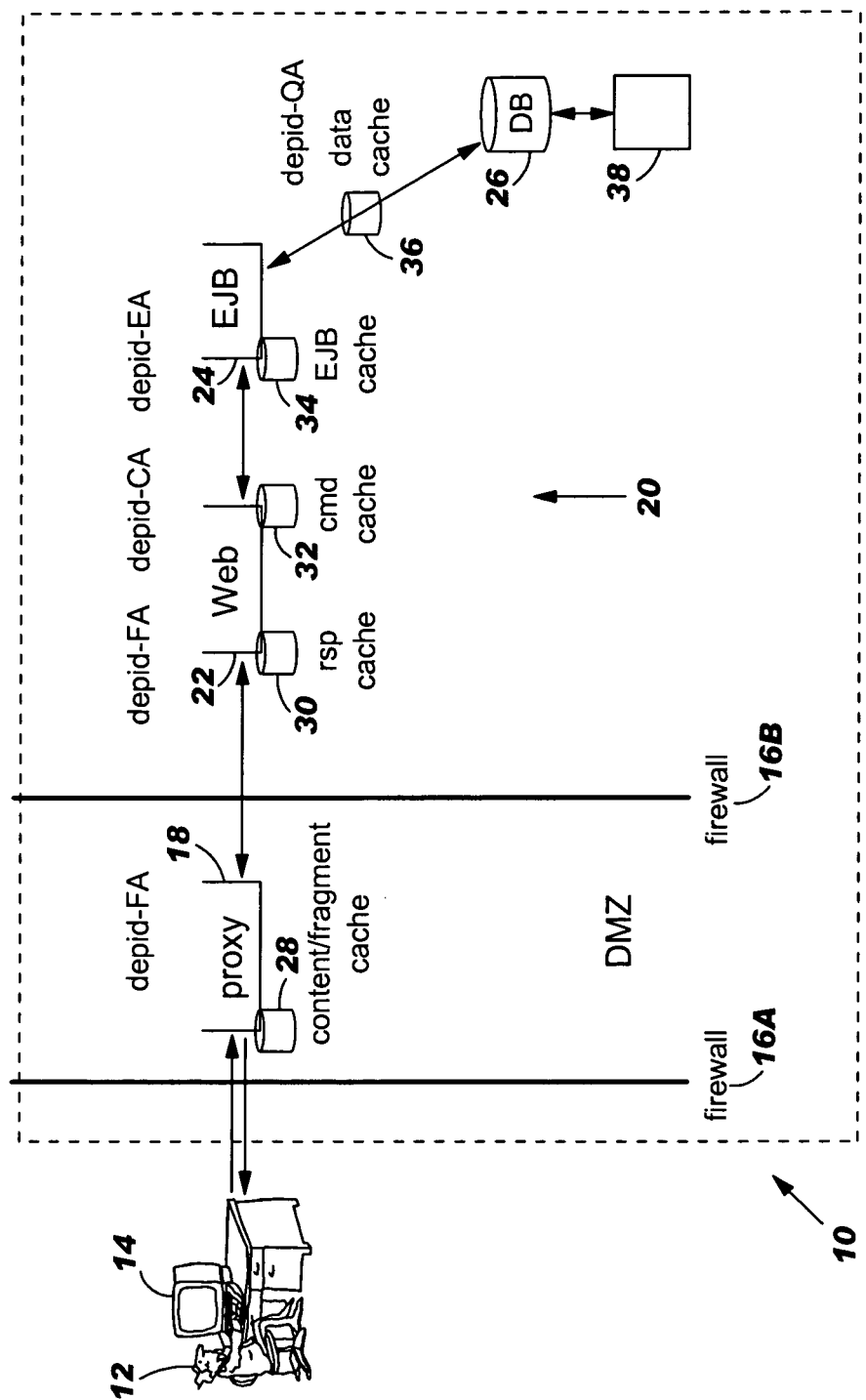
FIG. 1 depicts an exemplary architecture for delivering a dynamic web page.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for maintaining data consistency across a hierarchy of caches. Specifically, under the present invention, each cache in the hierarchy includes one or more data/cache entries into which data items can be stored. Each "parent" cache could include one or more data entries that are dependent on one or more data entries of "child" caches. To this extent, each data entry is assigned its own dependency identifier as well as the dependency identifiers of the data entries on which it depends. Thus, each data entry will inherit the dependency identifiers of all other data entries on which it depends. Then, when a particular dependency identifier is invalidated, all data entries having that dependency identifier will be automatically invalidated.

Referring now to FIG. 1, an exemplary architecture 10 for delivering web content is shown. Specifically, user 12 will manipulate user (computer) system 14 to request a web page or the like, which will be generated and delivered by architecture 10. Architecture 10 is intended to represent a WebSphere Application Server deployment that utilizes Java 2, Enterprise Edition (J2EE). It should be understood in advance, however, that such an implementation is illustrative only and that the teachings of the present invention could be incorporated with any alternative technology or architecture. For example, the teachings of the present invention could be implemented in a non-J2EE environment and/or with a different architecture (e.g., without proxy 18).

As shown, architecture 10 includes a hierarchy of caches 28, 30, 32, 34 and 36. Each cache typically has a set (e.g., one or more) of data/cache entries in which data items can be stored. Generally, each data entry has at least three references: (1) a request; (2) a cache identifier; and (3) a dependency identifier. The request specifies exactly what data item is stored. As such, the request could include a particular URL from where the data item was obtained. The cache identifier is generally a modified version of the request that includes only the minimum information necessary to identify the requested data item. For example, the URL in the request could include several elements or characters that are superfluous. In this event, the cache identifier will not include such elements or characters. The dependency identifier is a string or set of strings associated with the data entry for purpose of grouping like entries. As will be further described below, caches 28, 30, 32, 34 and 36 are considered a hierarchy because each could include data entries that are dependent on data entries of the others. Specifically, caches 28, 30, 32, 34 and 36 typically build upon each other so that the data and/or tasks stored in a previous or child cache is added to (or otherwise operated on) and stored in parent cache. For example, if a stock price is stored in data cache 36, EJB cache 34 could contain a percentage of change of the stock price from a previous price (and optionally the stock price itself).

In general, when user 12 first requests his/her web page, an HTTP request is generated and transmitted from user system 14. In the J2EE embodiment shown in FIG. 1, the request for the web page could include a request for a file having a .JSP suffix such as "A.JSP." The request could also include information (e.g., as a cookie) that identifies user 12. As shown, the HTTP request will first be received by proxy 18, which could be an "edge" server or the like. Proxy 18 is positioned between fire walls 16A–B (i.e., in a DMZ or demilitarized zone) for enhanced security. Since the HTTP request in this example is an initial request for the web page, it will be assumed that caches 28, 20, 32, 34 and 36 are empty.

When the request is received by proxy 18, proxy cache 28 will "miss", which causes the request to be forwarded to back end 20. Back end 20 can be a web server or the like that includes web system/container 22 and enterprise java bean (EJB) system/container 24. Web system 22 includes servlets and JSPs running in J2EE. To this extent, a servlet in web system 22 will first look at the identity of user 12 contained in the HTTP request. Based on the identity, web system 22 will obtain the "configuration" for user 12's web page. The "configuration" could dictate the data items (e.g., sports, weather, business, particular stocks, etc.) user 12 has designated, as well as the template (e.g., portlet layout, colors, etc.) for the web page. Since response cache 30 is empty, a cache miss will result. This causes web system 22 to execute the requested file (e.g., A.JSP). Typically, the requested file will issue a hierarchy of internal requests, each one's response being individually cacheable. Upon execution, the requested file invokes one or more commands (e.g., B-Commands). Since command cache 34 is empty, the B-Commands command will be executed. Once executed, B-Commands will invoke an EJB (e.g., C-EJB) within EJB system 24. EJB system 24 contains the "business logic" for building the web page. For example, EJB system 24 will generate the necessary queries for obtaining the appropriate template (e.g., layout, colors, etc.) and data items for the web page. Similar to caches 28, 30 and 32, since EJB cache 34 is empty, C-EJB will generate a query (e.g., D-Query) of database 26. It should be understood that data items could be inserted into database 26 by an external source 38. For example, if user 12's web page includes a portlet for "Sports,"sports data items could be provided to database 26 by the Associated Press.

In any event, as the data items are retrieved from database 26 and the web page is generated, the data entries in caches 28, 30, 32, 34 and 36 will be populated. For example, if one of the data items retrieved is a stock price, the stock price will initially be stored in a data entry within data cache 36. As shown, that data entry has been assigned the dependency identifier "depid-QA." Once cached, C-EJB of EJB system 34 will perform a data operation based on the data item and cache the result (possibly along with the actual data item) in EJB cache 34. The data entry in which the result has been cached is shown to have been assigned the dependency identifier of "depid-EA." It should be understood that the data operation performed can be any process step that utilizes the data item. For example, C-EJB could compute a percentage of change of the stock price from the previous stock price. In any event, once the result of the data operation performed by C-EJB is cached, a B-Command will receive the result from C-EJB and cache the same in command cache 34. Another B-Command can perform a data operation based on the result. For example, the other B-Command can retrieve and cache the user's other stock portfolio information in command cache 34. As depicted, the information cached by the B-Commands are stored in the data entry having the dependency identifier "depid-CA." A.JSP will then perform a data operation on the result from the B-Commands and typically serve the response as two fragments: A1.JSP and A2.JSP. These fragments are cached in the response cache 30 and the proxy cache 28 in data entries having the dependency identifier "depid-FA." In serving the two fragments, A.JSP will create an HTML document that formats the data item for the user's browser. To this extent, A.JSP could also cache pieces of HTML that are intended to be common or a group of users. For example, there could be a specific banner advertisement that is to be displayed for all users, regardless of the configuration of their individual web pages. Such an advertisement could be also cached in response cache 30 and proxy cache 28 for easy access. In any event, the completed web page is then delivered to user 12's browser as a response.

As can be seen, caches 28, 30, 32, 34 and 36 form a hierarchy because each cache along the chain builds upon the contents of its predecessors. To this extent, caches 28, 30, 32, 34 and 36 could each represent a node in a hierarchical "tree." In this case, proxy cache 28 and response cache 30 would be the top or parent nodes. Command cache 32 would be a child of proxy cache 28 and response cache 30, EJB cache 34 would be a child of command cache 32, and data cache 36 would be a child of EJB cache 34. Utilizing caches in this manner reduces the consumption of resources required by such requests. For example, if another user issues a request for his/her web page, and the web page is configured to present the same stock price as user 12's web page, a separate query of database 26 is not necessary. Rather, the stock price could be obtained from data cache 36 (or any other caches 28, 30, 32 and 34 that might also contain the stock price). It should be appreciated that although architecture 10 illustrated in FIGS. 1 and 2 depicts a four level hierarchy of five caches, the teachings of the present invention could be implemented with any quantity of hierarchical levels and/or caches.

As indicated above, when a data item is no longer valid, its corresponding entries in caches 28, 30, 32, 24 and 36 must be invalidated. If one or more corresponding data entries are not invalidated, data inconsistency will result. Prior to the present invention, invalidation of corresponding data entries has required issuing separate invalidation statements for each data entry, or manually linking corresponding data entries together. Either tactic is not desirable due to the undue amount of work that could be involved. Accordingly, the present invention provides an efficient way to automatically link/associate dependent data entries together.

Specifically, the present invention provides automatic linking of dependent data entries by allowing dependency identifiers to be inherited by dependent data entries. Specifically, referring now to FIG. 2, it can be seen that each data entry will be assigned not only its own dependency identifier, but also the dependency identifier for any other data entry on which it depends (i.e., the data entry will inherit the dependency identifier of the other entry). Using the example described in conjunction with FIG. 1 of obtaining a particular stock price, upon retrieval from database 26, the stock price will be stored in data cache 36. As shown, the stock price is stored in a data entry having the dependency identifier "depid-QA." Once C-EJB performs its data operation on the stock price, the result will be stored in a data entry in EJB cache that is assigned both dependency identifier "depid-EA" and "depid-QA." At this point the two data entries are now linked. Following the along the hierarchy of caches, the result of the data operation performed by the B-Command on the C-EJB result is cached in a data entry in command cache 32 that is assigned the dependency identifiers of "depid-CA," "depid-EA" and "depid-QA." Similarly, the result of the data operation performed by A.JSP on the results in command cache 32 would be stored in a data entry in response cache 30 and proxy cache 28 that is assigned the dependency identifiers of "depid-FA," "depid-CA," "depid-EA" and "depid-QA." When the stock price changes or is otherwise no longer valid, all corresponding data entries can be automatically invalidated with one command. For example, by invalidating dependency identifier "depid-QA," all data entries that have been assigned that dependency identifier will be invalidated. This would automatically cause invalidation of the corresponding data entries in all caches 28, 30, 32, 24 and 36. Thus, data consistency is maintained throughout the hierarchy of caches.

Figure 2:
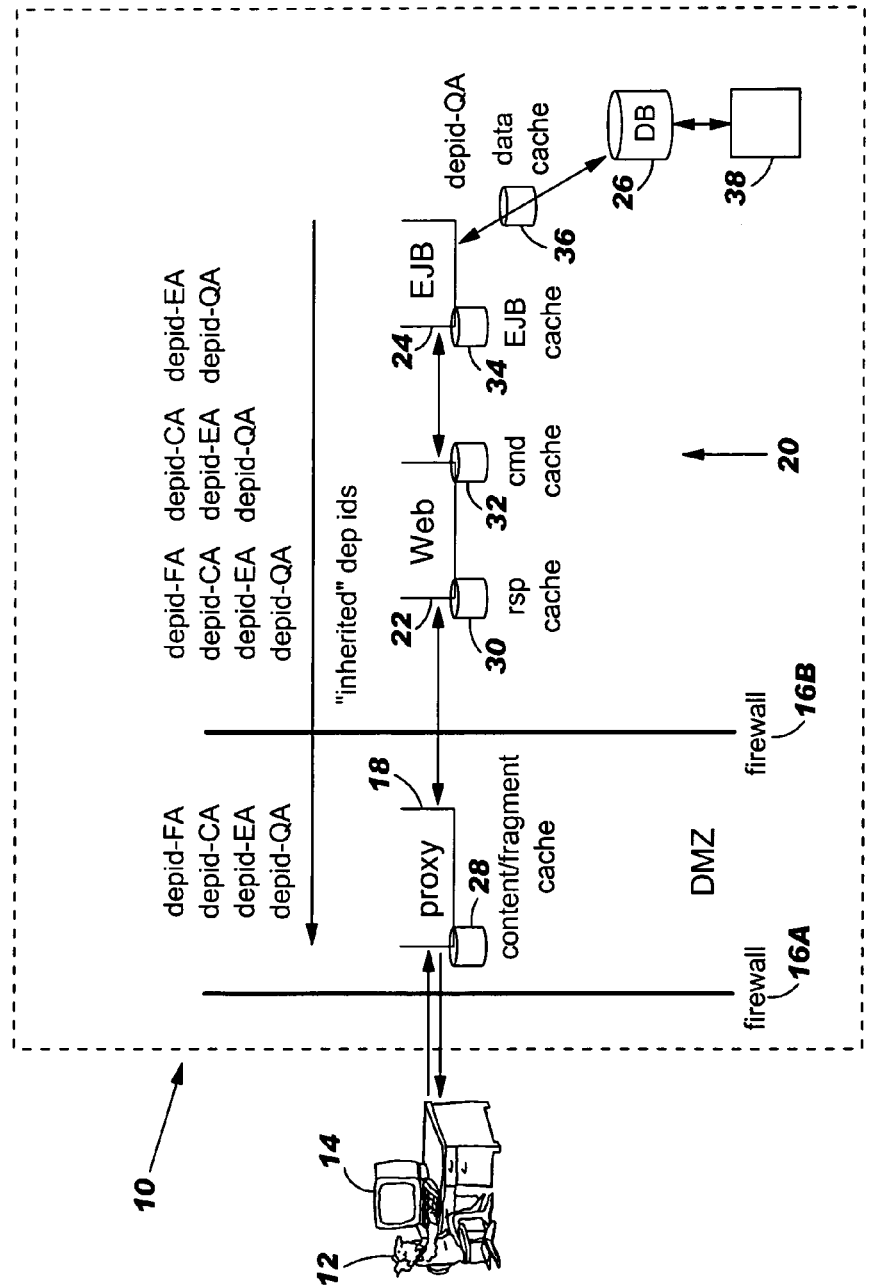
FIG. 2 depicts the architecture of FIG. 1 after dependency identifiers have been assigned according to the present invention.
Figure 3:
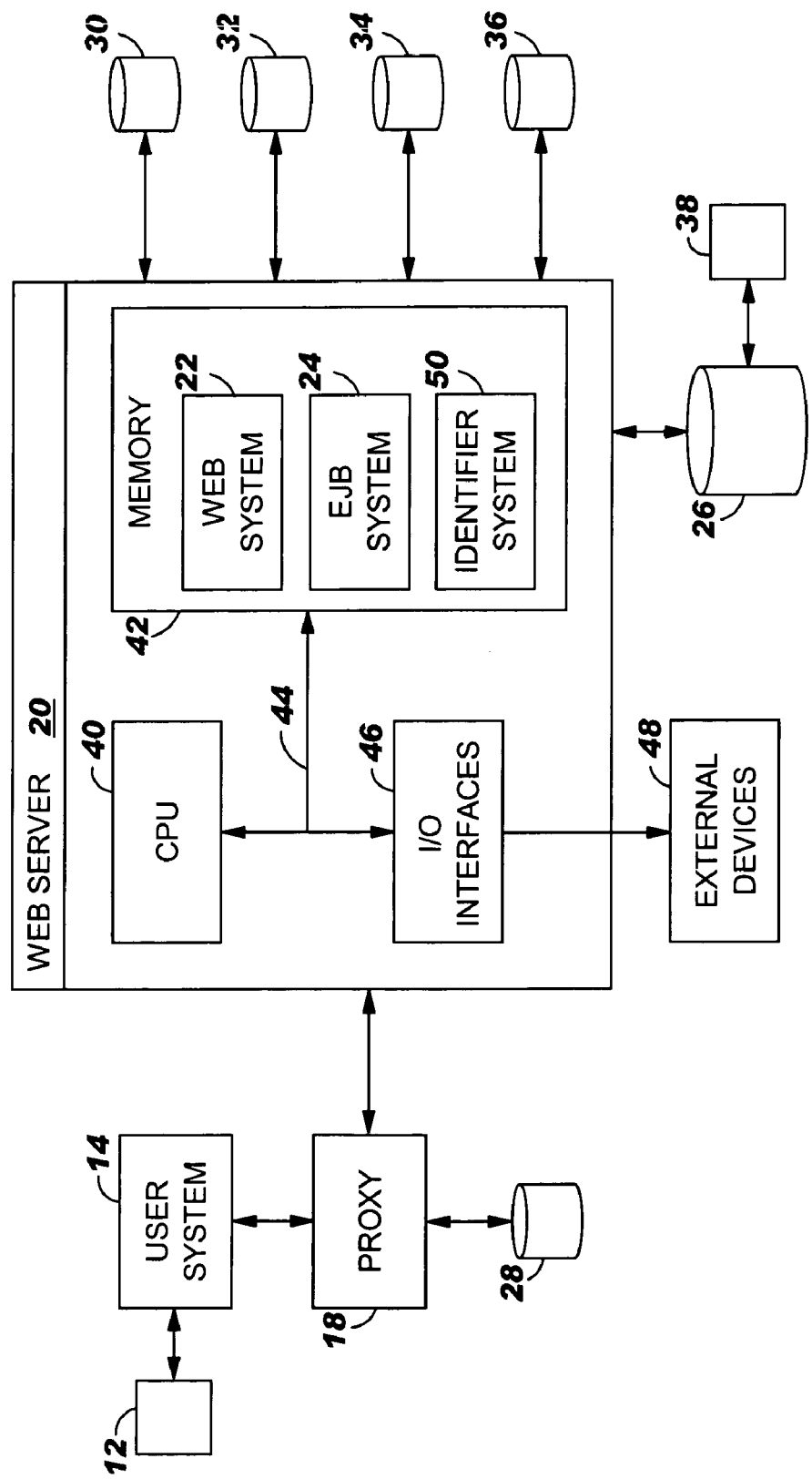
FIG. 3 depicts a computerized implementation of the system of FIG. 2.

Referring now to FIG. 3, a more detailed computerized implementation of architecture 10 of FIGS. 1 and 2 is shown. As depicted, web server 20 generally includes central processing unit (CPU) 40, memory 42, bus 44, input/output (I/O) interfaces 46, external devices/resources 48 and database 26. CPU 40 may comprise a single processing unit, or be distributed across one or more processing units in one or more locations, e.g., on a client and server. Memory 42 may comprise any known type of data storage and/or transmission media, including magnetic media, optical media, random access memory (RAM), read-only memory (ROM), a data cache, a data object, etc. Moreover, similar to CPU 40, memory 42 may reside at a single physical location, comprising one or more types of data storage, or be distributed across a plurality of physical systems in various forms.

I/O interfaces 46 may comprise any system for exchanging information to/from an external source. External devices/resources 48 may comprise any known type of external device, including speakers, a CRT, LED screen, hand-held device, keyboard, mouse, voice recognition system, speech output system, printer, monitor, facsimile, pager, etc. Bus 44 provides a communication link between each of the components in web server 20 and likewise may comprise any known type of transmission link, including electrical, optical, wireless, etc. In addition, although not shown, additional components, such as cache memory, communication systems, system software, etc., may be incorporated into web server 20.

Database 26 provides storage for information under the present invention. Such information could include, for example, data items, template characteristics (e.g., web page layout and colors), etc. As such, database 26 may include one or more storage devices, such as a magnetic disk drive or an optical disk drive. In another embodiment, database 26 includes data distributed across, for example, a local area network (LAN), wide area network (WAN) or a storage area network (SAN) (not shown). Database 26 may also be configured in such a way that one of ordinary skill in the art may interpret it to include one or more storage devices.

It should be understood that communication between user system 14, proxy 18 and web server 20 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As indicated above, an initial request by user 12 for a web page would result in an HTTP request being generated and sent from user system 14 to proxy 18. Since proxy cache 28 would be empty at this time, the HTTP request would be forwarded to web server 20. It should be understood that although not shown for brevity purposes, user system 14 and proxy 18 would typically include computerized components (e.g., CPU, memory, etc.) similar to web server 20. Shown in memory 42 are web system 22, EJB system 24 and identifier system 50. It should be understood, that these systems are shown within memory 42 of a single web server for illustrative purposes only. To this extent, web system 22, EJB system 24 and/or identifier system 50 could be arranged in a distributed fashion on network-connected computers.

As indicated above, a servlet within web system 22 would initially identify user 12 and determine user 12's web page "configuration." A program such as A.JSP would be executed, which would invoke one or more commands such as B-Commands. The B-Commands would call one or more EJBs such as C-EJB in EJB system 24. Once invoked, C-EJB would query database 26 to obtain the requested information.

After the requested data item has been obtained, population of data entries of caches 28, 30, 32, 34 and 36 would occur as indicated above. As the data entries are populated, dependency identifiers are assigned by identifier system 50. Specifically, upon retrieval, EJB system 24 would store the data item in a data entry in data cache 36. Identifier system 50 would then assign a dependency identifier (e.g., depid-QA) to the data entry. Then, C-EJB would perform some operation on the data item the result would be stored in a data entry within EJB cache 34. Once stored, identifier system 50 would assign this data entry its own dependency identifier (e.g., depid-EA) as well as the dependency identifier (e.g., depid-QA) for the corresponding data entry in data cache 36. Then, the result stored in EJB cache would be operated on by a B-Command and the new result would be stored in a data entry within command cache 32. Identifier system 50 would then assign this data entry within command cache 32 its own dependency identifier (e.g., depid-CA) as well as the dependency identifiers (e.g., depid-EA and depid-QA) for the corresponding data entries in EJB cache 34 and data cache 36. A.JSP would then perform an operation on the result stored in command cache 32, and store the result in data entries within response cache 30 and proxy cache 28. Similar to the previous data entries, identifier system 50 would assign these data entries their own dependency identifier (e.g., depid-FA) as well as dependency identifiers (e.g., depid-CA, depid-EA and depid-QA) for the corresponding data entries in the previous caches, namely, command cache 32, EJB cache 34 and data cache 36.

It should be understood that although identifier system 50 typically assigns dependency identifiers to a data entry after a data item has been stored therein, this need not be the case. Rather, identifier system 50 could assign dependency identifiers and link the data entries prior to data item storage. It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 4:
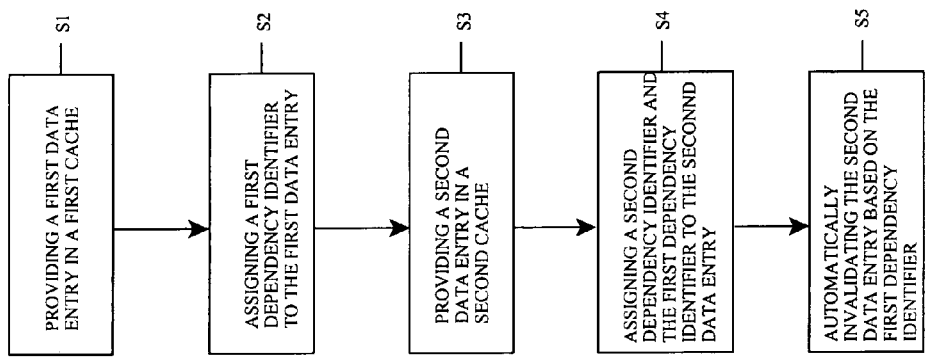
FIG. 4 depicts a flow diagram according to the current invention.

FIG. 4 shows a flow diagram according to the present invention. Step S1 involves providing a first data entry in a first cache. Step S2 involves assigning a first dependency identifier to the first data entry. Step S3 involves providing a second data entry in a second cache. Step S4 involves assigning a second dependency identifier and the first dependency identifier to the second data entry. Optional step S5 involves automatically invalidating the second data entry based on the first dependency identifier.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood that the J2EE For example, it should be understood that the J2EE implementation shown in FIGS. 1–3IA is intended to be an illustrative embodiment only. The teachings of inheriting dependency identifiers could be implemented in any architecture or with any technology. To this extent, the above description of multiple B-Commands and JSP fragments is not intended to be limiting. Moreover, although a specific example described herein referred to a stock price as a data item, it should be appreciated that the teachings of the present invention could be implemented to process a request for any type of data. Still yet, the nomenclature used for dependency identifiers (e.g., depid-QA) is intended to be purely illustrative only. That is, any set of values (number, letter or symbol) could be used to form a dependency identifier.

We claim:

1. A method for maintaining data consistency across a hierarchy of caches, comprising:
   providing a first data entry in a first cache;
   assigning a first dependency identifier to the first data entry;
   providing a second data entry in a second cache; and
   assigning a second dependency identifier and the first dependency identifier to the second data entry,
   wherein the first dependency identifier is used to maintain invalidation data consistency between the first data entry and the second data entry.

2. The method of claim 1, further comprising:
   providing a third data entry in a third cache; and
   assigning the third data entry a third dependency identifier, the second dependency identifier and the first dependency identifier,
   wherein the second dependency identifier is used to maintain invalidation data consistency between the second data entry and the third data entry, and
   wherein the first dependency identifier is used to maintain invalidation data consistency among the first data entry, the second data entry, and the third data entry.

3. The method of claim 2, further comprising:
   providing a fourth data entry in a fourth cache; and
   assigning the fourth data entry a fourth dependency identifier, the third dependency identifier, the second dependency identifier and the first dependency identifier,
   wherein the third dependency identifier is used to maintain invalidation data consistency between the third data entry and the fourth data entry,
   wherein the second dependency identifier is used to maintain invalidation data consistency among the second data entry, the third data entry, and the fourth data entry, and
   wherein the first dependency identifier is used to maintain invalidation data consistency among the first data entry, the second data entry, the third data entry, and the fourth data entry.

4. The method of claim 1, further comprising:
   receiving a request for a data item;
   obtaining the requested data item;
   storing the data item in the first data entry of the first cache;
   performing a data operation based on the data item; and
   storing a result of the data operation and the data item in the second entry of the second cache.

5. The method of claim 1, further comprising:
   invalidating the first data entry based on the first dependency identifier; and
   automatically invalidating the second data entry based on the first dependency identifier.

6. A method for maintaining data consistency across a hierarchy of caches, comprising:
   receiving a request for a data item;
   obtaining the data item;
   storing the data item in a first data entry of a first cache;
   assigning the first data entry a first dependency identifier;
   performing a data operation based on the data item;
   storing a result of the data operation in a second data entry of a second cache; and
   assigning the second data entry a second dependency identifier and the first dependency identifier.

7. The method of claim 6, further comprising:
   invalidating the first data entry based on the first dependency identifier; and
   automatically invalidating the second data entry based on the first dependency identifier.

8. A system for maintaining data consistency across a hierarchy of caches, comprising:
   a first data entry in a first cache, wherein the first data entry is assigned a first dependency identifier; and
   a second data entry in a second cache, wherein the second data entry is assigned a second dependency identifier and the first dependency identifier,
   wherein the first dependency identifier is used to maintain invalidation data consistency between the first data entry and the second data entry.

9. The system of claim 8, further comprising a third data entry in a third cache, wherein the third data entry is assigned a third dependency identifier, the second dependency identifier and the first dependency identifier,
   wherein the second dependency identifier is used to maintain invalidation data consistency between the second data entry and the third data entry, and
   wherein the first dependency identifier is used to maintain invalidation data consistency among the first data entry, the second data entry, and the third data entry.

10. The system of claim 9, further comprising a fourth data entry in a fourth cache, wherein the fourth data entry is assigned a fourth dependency identifier, the third dependency identifier, the second dependency identifier and the first dependency identifier,
    wherein the third dependency identifier is used to maintain invalidation data consistency between the third data entry and the fourth data entry,
    wherein the second dependency identifier is used to maintain invalidation data consistency among the second data entry, the third data entry, and the fourth data entry, and
    wherein the first dependency identifier is used to maintain invalidation data consistency among the first data entry, the second data entry, the third data entry, and the fourth data entry.

11. The system of claim 8, wherein the first data entry includes a requested data item, and wherein the second data entry includes a result of a data operation performed based on the requested data item.

12. The system of claim 8, wherein invalidation of the first data entry automatically results in invalidation of the second data entry.

13. A system for maintaining data consistency across a hierarchy of caches comprising an identifier system for assigning a first dependency identifier to a first data entry of a first cache, and for further assigning the first dependency identifier and a second dependency identifier to a second data entry of a second cache, wherein the first dependency identifier is used to maintain invalidation data consistency between the first data entry and the second data entry.

14. The system of claim 13, wherein the identifier system further assigns a third dependency identifier, the second dependency identifier and the first dependency identifier to a third data entry of a third cache, wherein the second dependency identifier is used to maintain invalidation data consistency between the second data entry and the third data entry, and wherein the first dependency identifier is used to maintain invalidation data consistency among the first data entry, the second data entry, and the third data entry.

15. The system of claim 14, wherein the identifier system further assigns a fourth dependency identifier, the third dependency identifier, the second dependency identifier and the first dependency identifier to a fourth data entry of a fourth cache, wherein the third dependency identifier is used to maintain invalidation data consistency between the third data entry and the fourth data entry, wherein the second dependency identifier is used to maintain invalidation data consistency among the second data entry, the third data entry, and the fourth data entry, and wherein the first dependency identifier is used to maintain invalidation data consistency among the first data entry, the second data entry, the third data entry, and the fourth data entry.

16. The system of claim 13, wherein the first data entry includes a requested data item, and wherein the second data entry includes a result of a data operation performed based on the requested data item.

17. The system of claim 13, wherein invalidation of the first data entry automatically results in invalidation of the second data entry.

18. A program product stored on a computer readable medium for maintaining data consistency across a hierarchy of caches, which when executed, assigns a first dependency identifier to a first data entry of a first cache, and assigning assigns the first dependency identifier and a second dependency identifier to a second data entry of a second cache, wherein the first dependency identifier is used to maintain invalidation data consistency between the first data entry and the second data entry.

19. The program product of claim 18, wherein the program code for assigning further assigns a third dependency identifier, the second dependency identifier and the first dependency identifier to a third data entry of a third cache, wherein the second dependency identifier is used to maintain invalidation data consistency between the second data entry and the third data entry, and wherein the first dependency identifier is used to maintain invalidation data consistency among the first data entry, the second data entry, and the third data entry.

20. The program product of claim 19, wherein the program code for assigning further assigns a fourth dependency identifier, the third dependency identifier, the second dependency identifier and the first dependency identifier to a fourth data entry of a fourth caches, wherein the third dependency identifier is used to maintain invalidation data consistency between the third data entry and the fourth data entry, wherein the second dependency identifier is used to maintain invalidation data consistency among the second data entry, the third data entry, and the fourth data entry, and wherein the first dependency identifier is used to maintain invalidation data consistency among the first data entry, the second data entry, the third data entry, and the fourth data entry.

21. The program product of claim 18, wherein the first data entry includes a requested data item, and wherein the second data entry includes a result of a data operation performed based on the requested data item.

22. The program product of claim 18, wherein invalidation of the first data entry automatically results in invalidation of the second data entry.

\* \* \* \* \*